Jan. 6, 1948. J. S. SHARPE 2,434,082
MECHANICAL MOVEMENT
Filed Jan. 6, 1945 2 Sheets-Sheet 1

Inventor:
John S. Sharpe
by his Attorneys
Howson & Howson

Jan. 6, 1948.  J. S. SHARPE  2,434,082
MECHANICAL MOVEMENT
Filed Jan. 6, 1945   2 Sheets-Sheet 2

Inventor:
John S. Sharpe
by his Attorneys
Howson & Howson

Patented Jan. 6, 1948

2,434,082

UNITED STATES PATENT OFFICE 2,434,082

MECHANICAL MOVEMENT

John S. Sharpe, Haverford, Pa.

Application January 6, 1945, Serial No. 571,562

5 Claims. (Cl. 74—309)

A principal object of this invention is to provide an improved mechanical movement having utility in various classes of transmission as hereinafter set forth.

The invention may be more readily understood by reference to the attached drawings wherein.

Figure 1:
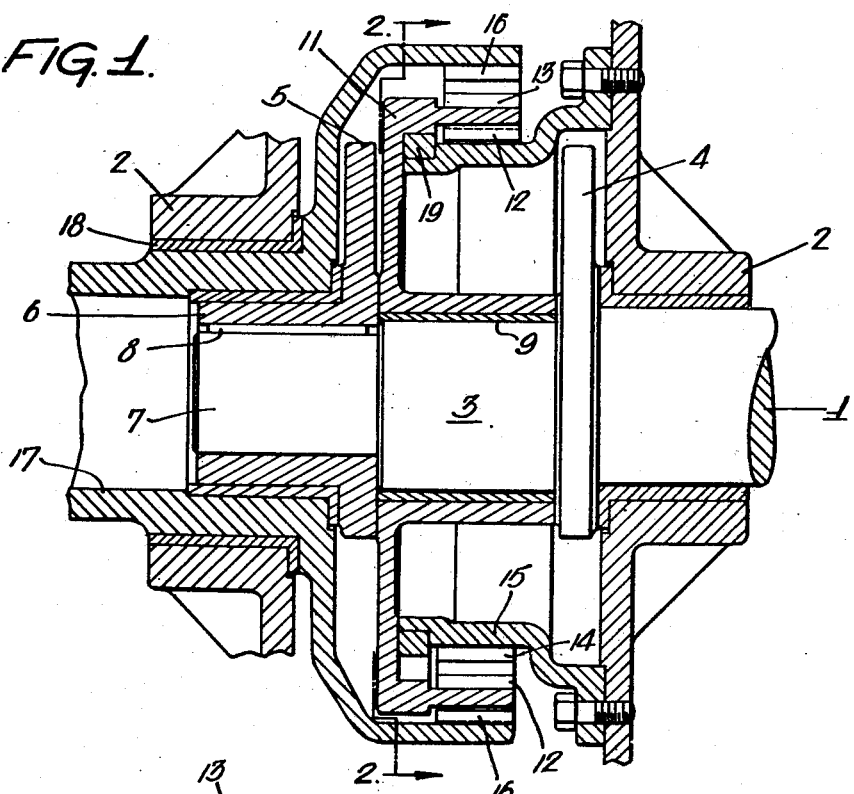
Fig. 1 is a sectional view of a reduction gear incorporating the mechanical movement.
Figure 2:
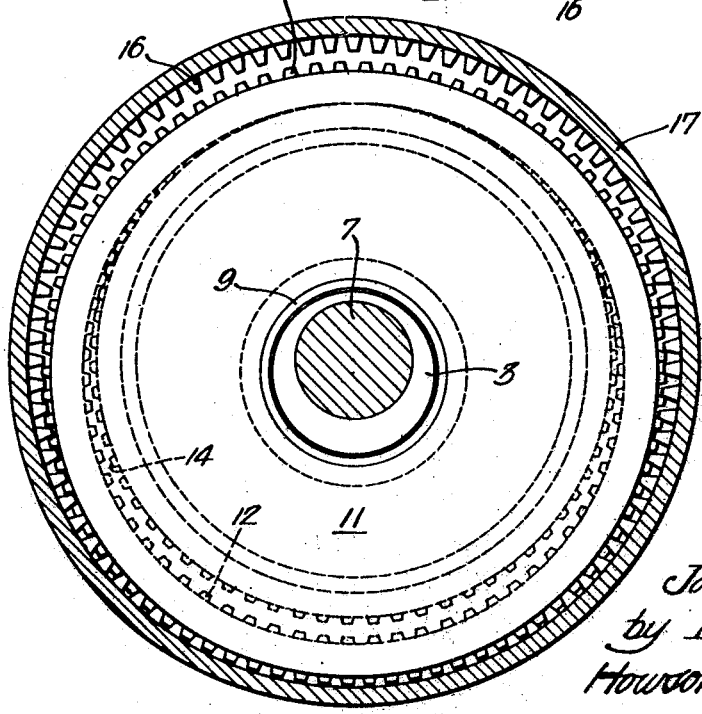
Fig. 2 is a sectional view on the line 2—2, Fig. 1.

The device illustrated in Figs. 1 and 2 comprises essentially a shaft 1 which, in the present instance, is journaled in a stationary frame or housing, parts of which are designated by the reference numeral 2. The shaft comprises an eccentric portion 3, and an integral counterweight 4 for the eccentric at one end of said eccentric portion. A corresponding counterweight 5 is provided at the opposite end of the eccentric, this counterweight being formed on a sleeve 6 which may be secured to the reduced end portion 7 of the shaft by a key 8 or by other suitable means.

Rotatably mounted on the eccentric 3 through the medium of a bushing 9 is a composite member 11 which comprises internal and external gear elements 12 and 13 respectively. The internal gear 12 meshes with a gear 14 on an extension 15 of the frame 2, the gear 14 being coaxial with the axis of the shaft 1. The external gear 13 meshes with an internal gear 16 on a shaft 17, this shaft being journaled in a bushing 18 in the frame 2 in coaxial relation with the shaft 1. The gear 16 is also coaxial with the shafts.

In accordance with the invention, the member 11 finds a bearing not only on the eccentric 3 but also directly on the frame 2. The latter bearing is provided by a bushing 19 on the frame extension 15, and contact between the member 11 and the bushing occurs at a position on the bushing 180° removed from and with respect to the major throw of the eccentric 3, this relation being maintained irrespective of the angular position of the shaft or of the member 11. True rolling contact between the said member and the bushing is obtained by making the bushing correspond in diameter to the pitch circle of the gear 14.

In operation, and assuming that the shafts 1 and 17 constitute driving and driven shafts respectively, the movement of the member 11 resulting from rotation of the drive shaft, and by reason of its reaction through the gear elements 12 and 14, will cause the gear element 13 to drive the internal gear 16 at a rate materially less than that of the shaft 1 but in the same direction, the ratio in the present instance being 10 to 1. In this rotary movement, the counterweights 4 and 5 counterbalance the eccentric 3; and the centrifugal load of the member 11 upon the eccentric, which otherwise would fall entirely upon the eccentric bearing, is reacted through the bushing 19 directly with the frame 2. It is this bearing for the centrifugal load which makes the movement practical in high speed operation, since it not only relieves the load on the eccentric bearing but also relieves the load on shaft bearings and more uniformly distributes the load on the frame.

Figure 3:
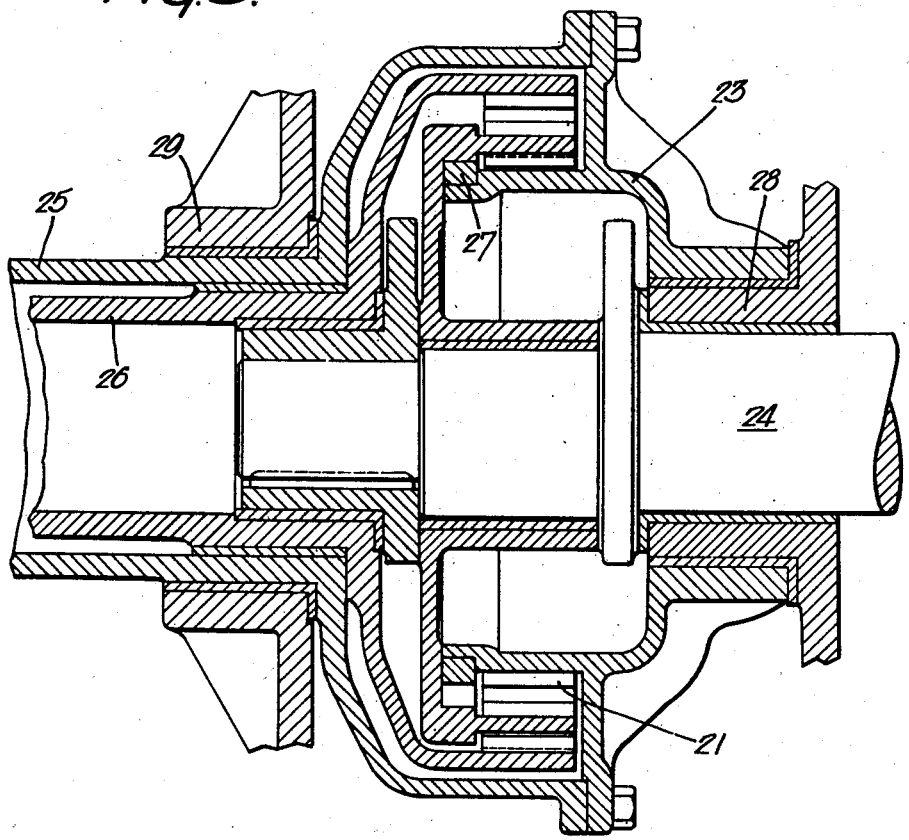
Fig. 3 is a sectional view of a transmission unit illustrating another application of the invention.

In Fig. 3, the invention is shown in its application to a somewhat different type of transmission. In this case the gear 21, which corresponds to the gear 14 of the previously described embodiment, is mounted not on the stationary frame 22 of the unit, but upon a rotary member 23 which is coaxial with the shaft 24 and is attached to a second driven shaft 25. In all other respects the device corresponds structurally to that shown in Figs. 1 and 2. In operation, however, the driven shafts 25 and 26 will tend to rotate in opposite directions, and at a speed one-twentieth that of the drive shaft, the shaft 26 turning in the same direction as the drive shaft 24, and the shaft 25 in the reverse direction. If one of the driven shafts is loaded to an extent greater than the other, the device will tend automatically to compensate the inequality by a proportionate variation in the speeds of the said shafts.

While in this instance the part of the centrifugal load falling on the bushing 27 is not imposed directly on the frame, the effect is the same, since it is taken by the frame through the bearings 28 and 29 of the shaft 25.

I claim:

1. A mechanical movement comprising a rotary element, a member journaled eccentrically on said element for movement in a circular path about and concentric with the axis of rotation of said element, a circular bearing for said member concentric with said axis, a gear having a pitch diameter corresponding to the effective diameter of said circular bearing and coaxial with the latter, and said member including a gear concentric with said eccentric journal and meshing with the gear first named.

2. A mechanical movement comprising a rotary element, a member journaled eccentrically on said element for movement in a circular path about and concentric with the axis of rotation of said element, a circular bearing for said member concentric with said axis, a stationary gear having a pitch diameter corresponding to the effective diameter of the bearing and coaxial with the latter, and said member including a gear concentric with the axis of said eccentric journal and meshing with said stationary gear.

3. A mechanical movement comprising a rotary element, a member journaled eccentrically on said element for movement in a circular path about and concentric with the axis of rotation of said element, a circular bearing for said member concentric with said axis, a gear having a pitch diameter corresponding to the effective diameter of the bearing and coaxial with the latter, a second and separate gear coaxial with said bearing, and said member including gears concentric with the axis of said eccentric journal and engaged respectively with the gears first named.

4. A mechanical movement comprising a rotary element, a member journaled eccentrically on said element for movement in a circular path about and concentric with the axis of rotation of said element, a circular bearing for said member concentric with said axis, a gear having a pitch diameter corresponding to the effective diameter of the bearing and coaxial with the latter, a second and separate gear coaxial with said bearing and of greater diameter than the first gear, and said member including internal and external gear elements both concentric with the axis of said eccentric journal and engaged respectively with the said first named and second gears.

5. A mechanical movement comprising a rotary element, a member journaled eccentrically on said element for movement in a circular path about and concentric with the axis of rotation of said element, a circular bearing for said member concentric with said axis, a stationary gear having a pitch diameter corresponding to the effective diameter of the bearing and coaxial with the latter, a separate rotary internal gear coaxial with said bearing and of greater diameter than the stationary gear, and said member including internal and external gear elements each concentric with the axis of the eccentric journal and meshing respectively with the said stationary and separate rotary gears.

JOHN S. SHARPE.

REFERENCES CITED

The following references are of record in the file of this patent:

UNITED STATES PATENTS

| Number | Name | Date |
|---|---|---|
| 128,352 | Andrews | June 25, 1872 |
| 595,076 | Regan | Dec. 7, 1897 |
| 1,116,970 | Apple | Nov. 10, 1914 |
| 1,770,035 | Heap | July 8, 1930 |
| 2,049,696 | Fleisberg | Aug. 4, 1936 |

FOREIGN PATENTS

| Number | Country | Date |
|---|---|---|
| 457,026 | France | July 2, 1913 |